(12) United States Patent
Takahashi et al.

(10) Patent No.: US 9,906,766 B2
(45) Date of Patent: Feb. 27, 2018

(54) IMAGING DEVICE

(71) Applicant: Clarion Co., Ltd., Saitama (JP)

(72) Inventors: Teruki Takahashi, Saitama (JP); Takahide Kojima, Saitama (JP); Kouji Obata, Saitama (JP)

(73) Assignee: Clarion Co., Ltd., Saitama (JP)

( * ) Notice: Subject to any disclaimer, the term of this patent is extended or adjusted under 35 U.S.C. 154(b) by 196 days.

(21) Appl. No.: 14/414,530

(22) PCT Filed: Feb. 7, 2014

(86) PCT No.: PCT/JP2014/052848
§ 371 (c)(1),
(2) Date: Jan. 13, 2015

(87) PCT Pub. No.: WO2014/129319
PCT Pub. Date: Aug. 28, 2014

(65) Prior Publication Data
US 2015/0172618 A1 Jun. 18, 2015

(30) Foreign Application Priority Data
Feb. 21, 2013 (JP) ................................. 2013-032202

(51) Int. Cl.
*H04N 9/77* (2006.01)
*H04N 9/04* (2006.01)
(Continued)

(52) U.S. Cl.
CPC ................. *H04N 9/77* (2013.01); *B60R 1/00* (2013.01); *H04N 5/33* (2013.01); *H04N 5/332* (2013.01);
(Continued)

(58) Field of Classification Search
CPC ............ H04N 5/332; H04N 5/33; H04N 9/68; H04N 2209/047; H04N 9/646; H04N 9/045; H04N 9/77; B60R 1/00; B60R 2300/106
See application file for complete search history.

(56) References Cited

U.S. PATENT DOCUMENTS

| 4,642,677 A | * | 2/1987 | Takanashi | H04N 9/045 348/223.1 |
| 5,889,554 A | * | 3/1999 | Mutze | H04N 9/045 348/273 |

(Continued)

FOREIGN PATENT DOCUMENTS

| EP | 0869683 A2 | 10/1998 |
| JP | 2001-086402 A | 3/2001 |

(Continued)

OTHER PUBLICATIONS

The extended European search report issued by the European Patent Office on Mar. 10, 2016, which corresponds to European Patent Application No. 14754831.7-1902 and is related to U.S. Appl. No. 14/414,530.

(Continued)

*Primary Examiner* — Sath V Perungavoor
*Assistant Examiner* — Philip Dang
(74) *Attorney, Agent, or Firm* — Studebaker & Brackett PC

(57) ABSTRACT

An image sensor including a plurality of pixels on which three types of filters which transmit light having different wavelengths and have transmittances equal to each other in a visible light region, and a clear filter in which a transmittance of the visible light region is expressed by a linear sum of the transmittances of the filters and which has a transmittance equal to the transmittances of the filters in a near-infrared light region are arranged, the image sensor outputs a first output signal, an output signal linear-trans- (Continued)

forming part transforms the first output signal into a second output signal having linearity, a color signal-generating part generates color signals, an infrared-separating part generates infrared-separated color signals, a luminance signal-generating part generates a luminance signal from the first output signal, and a color-luminance-combining part combines the infrared-separated color signals and the luminance signal and generates video signals.

7 Claims, 11 Drawing Sheets

(51) Int. Cl.
  *H04N 5/33*    (2006.01)
  *H04N 9/64*    (2006.01)
  *H04N 9/68*    (2006.01)
  *B60R 1/00*    (2006.01)

(52) U.S. Cl.
  CPC ............. *H04N 9/045* (2013.01); *H04N 9/646* (2013.01); *H04N 9/68* (2013.01); *B60R 2300/106* (2013.01); *H04N 2209/047* (2013.01)

(56) References Cited

U.S. PATENT DOCUMENTS

| | | | | |
|---|---|---|---|---|
| 6,992,718 | B1* | 1/2006 | Takahara | G02B 23/14 348/333.09 |
| 7,194,146 | B2* | 3/2007 | BenDaniel | G06T 5/00 348/207.1 |
| 7,242,432 | B2* | 7/2007 | Watanabe | H04N 3/1562 348/280 |
| 7,542,084 | B2* | 6/2009 | Watanabe | H04N 3/155 348/266 |
| 7,920,908 | B2* | 4/2011 | Hattery | A61B 5/0059 600/407 |
| 8,218,099 | B2* | 7/2012 | Yamazaki | H01L 27/1225 349/19 |
| 8,324,626 | B2* | 12/2012 | Kimura | H01L 27/1225 257/59 |
| 2006/0097978 | A1* | 5/2006 | Ng | G02F 1/133603 345/102 |
| 2006/0178565 | A1* | 8/2006 | Matsui | A61B 1/00009 600/160 |
| 2007/0145273 | A1 | 6/2007 | Chang | |
| 2007/0182836 | A1 | 8/2007 | Chino | |
| 2008/0203305 | A1 | 8/2008 | Suzuki | |
| 2008/0278592 | A1 | 11/2008 | Kuno et al. | |
| 2008/0278602 | A1* | 11/2008 | Otsu | H04N 3/1562 348/223.1 |
| 2009/0213252 | A1 | 8/2009 | Kim et al. | |
| 2009/0326383 | A1* | 12/2009 | Barnes | A61B 5/0059 600/476 |
| 2010/0039538 | A1* | 2/2010 | Ikedo | H04N 5/23225 348/241 |
| 2010/0128149 | A1 | 5/2010 | Kim et al. | |
| 2010/0165111 | A1* | 7/2010 | Gorian | G06K 9/00771 348/164 |
| 2010/0214455 | A1* | 8/2010 | Simon | G06T 3/4015 348/273 |
| 2010/0231770 | A1 | 9/2010 | Honda et al. | |
| 2010/0283866 | A1 | 11/2010 | Numata | |
| 2011/0228097 | A1* | 9/2011 | Motta | H04N 5/33 348/164 |
| 2011/0267482 | A1* | 11/2011 | Wetzstein | G06T 5/50 348/218.1 |
| 2011/0310277 | A1* | 12/2011 | Imamura | H04N 9/045 348/279 |
| 2012/0116192 | A1* | 5/2012 | Saito | A61B 1/00009 600/323 |
| 2012/0179050 | A1* | 7/2012 | Saito | A61B 1/00009 600/476 |
| 2012/0189226 | A1* | 7/2012 | Okada | G06T 5/20 382/260 |
| 2012/0293634 | A1* | 11/2012 | Ishii | G03B 35/10 348/49 |
| 2012/0306940 | A1* | 12/2012 | Machida | G02B 6/005 345/690 |
| 2013/0208117 | A1 | 8/2013 | Kamon et al. | |

FOREIGN PATENT DOCUMENTS

| | | |
|---|---|---|
| JP | 2008-219140 A | 9/2008 |
| JP | 4386096 B2 | 10/2009 |
| JP | 4407448 B2 | 11/2009 |
| JP | 2011-259060 A | 12/2011 |
| WO | 2009/057478 A1 | 5/2009 |
| WO | 2011/155136 A1 | 12/2011 |

OTHER PUBLICATIONS

International Search Report; PCT/JP2014/052848; dated May 20, 2014.

* cited by examiner

FIG.5A

| X | Y | X | Y |
|---|---|---|---|
| T | Z | T | Z |
| X | Y | X | Y |
| T | Z | T | Z |

FIG.5B

| R | G | R | G |
|---|---|---|---|
| C | B | C | B |
| R | G | R | G |
| C | B | C | B |

FIG.5C

| $R_{11}$ | $G_{12}$ | $R_{13}$ | $G_{14}$ |
|---|---|---|---|
| $C_{21}$ | $B_{22}$ | $C_{23}$ | $B_{24}$ |
| $R_{31}$ | $G_{32}$ | $R_{33}$ | $G_{34}$ |
| $C_{41}$ | $B_{42}$ | $C_{43}$ | $B_{44}$ |

…

IMAGING DEVICE

TECHNICAL FIELD

The present invention relates to an imaging device including an image sensor, and in particular, relates to an imaging device which generates a suitable color image even in a case of photographing a photographic subject in which contrast between light and shade (dynamic range) is large.

BACKGROUND ART

In recent years, there has been an increased interest in preventive safety regarding traffic accidents, and as a technology in an automobile drive support system, research and development of an in-vehicle monitoring imaging device have been actively carried out. However, a problem occurs when darkness at night and high-luminance signal light and vehicle light (headlight, and the like) exist at the same time as contrast between light and shade is extremely large and visibility is poor. It is, therefore, necessary to ensure a monitoring performance of an imaging device even in a state where visibility is poor, so as to distinguish the color of a signal and a traffic lane and to ensure color reproducibility consistent with human color vision characteristics.

There is a problem in that in such a scene in which contrast between light and shade is extremely large, a general image sensor exceeds a limit of a dynamic range, and therefore, phenomena referred to as blown-out highlights in which due to over exposure, information of gradation is lost and a pure white image is generated, or conversely, phenomena referred to as blocked-up shadows in which due to under exposure, information of gradation is lost and a pitch black image is generated occur.

Accordingly, an image sensor has been proposed which expands a dynamic range by allowing a relationship between input luminance and an output signal to have a non-linear characteristic.

And in such an image sensor having a non-linear characteristic, a method has been proposed in which after transforming (linearization) an output signal of a region having a non-linear characteristic into a linear signal, various signal processings are performed, and then, a bit width of the signal is narrowed in accordance with a monitor to which an image is outputted, and outputted (for example, Patent Document 1).

On the other hand, IR color camera technology which performs color reproduction having sensitivity to a near-infrared light region by using a color filter which transmits near-infrared light as means for improving a monitoring performance with respect to pedestrians or traffic lanes in darkness has been developed.

Since an IR color camera does not have an infrared removal filter (IR cut filter), it has sensitivity even to light of a near-infrared light region, and by observing near-infrared light emitted from an observed object, or reflected light of near-infrared light emitted by an infrared projector, imaging is performed even in darkness where light from a headlight of a vehicle is not emitted.

An image sensor which can be applied to such an IR color camera has been developed (for example, Patent Documents 2, 3 and 4).

PRIOR ART DOCUMENTS

Patent Documents

[PATENT DOCUMENT 1] Japanese Patent Application Publication No. 2001-86402
[PATENT DOCUMENT 2] Japanese Patent No. 4407448
[PATENT DOCUMENT 3] US Patent Application Publication No. 2007/0145273
[PATENT DOCUMENT 4] Japanese Patent No. 4386096

SUMMARY OF THE INVENTION

Problem to be Solved by the Invention

However, in the image-processing device disclosed in Patent Document 1, a signal is compressed by narrowing a bit width in a signal-processing process. This is equivalent to reducing information of a low luminance portion, and therefore, it is not possible to obtain a color image in which an original dynamic range which an image sensor has is sufficiently utilized. Therefore, for example, in a scene where a low-luminance photographic subject and a high-luminance photographic subject exist at the same time, in a case where an output signal obtained from an image region of the low-luminance photographic subject is included in a low-order bit to be reduced, color of the low-luminance photographic subject is not reproduced in an image to be finally outputted. That is, in a case of photographing a photographic subject in which contrast between light and shade (dynamic range) is large, there is a problem in that it is not possible to generate a color image in which the low-luminance photographic subject and the high-luminance photographic subject are reliably distinguishable.

Additionally, in the imaging device disclosed in Patent Document 2, in a case where spectral reflectivity of a near-infrared light region is different from a color chart used as a target when performing color correction, there is a problem in that color to be reproduced is different from actual color. For example, in photographic subjects such as tree leaves, clothes made of chemical fibers, and the like in which spectral reflectivity of a near-infrared light region is greatly different from a color chart, correct color reproducibility is not ensured.

Further, in the imaging devices disclosed in Patent Documents 3 and 4, by using a four-color color filter array, removal of a near-infrared light component is performed in signal processing based on addition and subtraction of four-color spectral sensitivity characteristics. However, in this signal processing, in a case where a so-called color saturation occurs, where one of the four color signals is saturated, there is a problem in that it is not possible to perform not only the removal of the near-infrared light component, but also a false color by saturation, where a signal which expresses color different from actual color is outputted, occurs.

That is, in any of the conventional technologies, when photographing a photographic subject in which contrast between light and shade is large, it is not possible to generate a suitable color image having a dynamic range in which the photographic subject is reliably distinguishable and color reproducibility is consistent with human color vision characteristics.

An object of the present invention is to provide an imaging device which generates a suitable color image in which even under a situation where contrast between light and shade is extremely large, an occurrence of blocked-up shadows and blown-out highlights is suppressed, and which has color reproducibility consistent with human color vision characteristics.

Means for Solving the Problem

By sufficiently utilizing an original dynamic range which an image sensor having a non-linear output characteristic with respect to brightness has, and utilizing a signal difference of output signals generated by an array of a plurality of filters having different transmittances included in the image sensor, even in a case of photographing a photographic subject in which contrast between light and shade (dynamic range) is large, an imaging device according to the present invention generates a suitable color image in which there are no blocked-up shadows or blown-out highlights, and color reproducibility is high.

That is, the imaging device according to the present invention is characterized in that it includes an image sensor, an output signal linear-transforming part, a color signal-generating part, an infrared-separating part, a luminance signal-generating part, and a color-luminance-combining part. The image sensor includes a plurality of pixels on which a plurality of filters are arranged in a predetermined pattern, and outputs from each of the pixels a first output signal which varies non-linearly in accordance with luminance of incident light incident to the pixels. The plurality of filters include three types of filters which selectively transmit light of a visible light region different from each other and have spectral transmittances equal to each other in a near-infrared light region, and one type of filter in which a spectral transmittance of a visible light region is expressed by a linear sum of the spectral transmittances of the three types of filters and which has a spectral transmittance equal to the spectral transmittances of the three types of filters in the near-infrared light region. When assuming that the image sensor outputs a second output signal which varies linearly throughout a luminance range of the incident light, the output signal linear-transforming part transforms the first output signal outputted from each of the pixels to the second output signal. From the second output signal, when assuming that a filter other than the filters of the plurality of filters arranged on the plurality of pixels is arranged, the color signal-generating part generates a plurality of color signals which are predicted to be outputted from the plurality of pixels. The infrared-separating part generates a plurality of infrared-separated color signals in which a near-infrared light component is separated from the plurality of color signals. The luminance signal-generating part generates a luminance signal from the first output signal. The color-luminance-combining part combines the plurality of the infrared-separated color signals and the luminance signal, and generates video signals.

In the imaging device according to the present invention thus structured, the image sensor includes a plurality of pixels on which a plurality of filters are arranged in a predetermined pattern, and the plurality of filters include three types of filters which selectively transmit light of a visible light region different from each other and have spectral transmittances equal to each other in a near-infrared light region, and one type of filter in which a spectral transmittance of a visible light region is expressed by a linear sum of the spectral transmittances of the three types of filters and which has a spectral transmittance equal to the spectral transmittances of the three types of filters in the near-infrared light region. And from the plurality of pixels, a first output signal is outputted which varies non-linearly in accordance with luminance of each incident light, and in the output signal linear-transforming part, when assuming that the image sensor outputs a second output signal which varies linearly throughout an input luminance range of the incident light, the first output signal is transformed into the second output signal which is predicted to be outputted from the image sensor. Based on the second output signal, with respect to all the pixels, the color signal-generating part generates a plurality of color signals by interpolating a plurality of lacking color signals, and from the generated plurality of color signals, the infrared-separating part separates a near-infrared light component and generates a plurality of infrared-separated color signals having linearity. Then, the luminance signal-generating part generates a luminance signal having non-linearity from the first output signal, and the color-luminance-combining part combines the thus generated plurality of infrared-separated color signals having linearity and luminance signal having non-linearity, and generates video signals. Therefore, even in a case of photographing a photographic subject in which a dynamic range is large, it is possible to generate a suitable color image in which there are no blown-out highlights or blocked-up shadows by a luminance signal having non-linearity and color reproducibility is high by color signals having linearity in which a near-infrared light component is separated.

Effect of the Invention

With an imaging device according to the present invention, it is possible to generate a suitable color image in which an occurrence of blocked-up shadows or blown-out highlights is suppressed and which has color reproducibility consistent with human color vision characteristics, even in a case of photographing a photographic subject in which a dynamic range is large.

BRIEF DESCRIPTION OF DRAWINGS

FIG. 5A is a diagram explaining one example of an array of color filters of the image sensor used in Embodiment 1 as one embodiment of the present invention.

FIG. 5B is an example of a filter structure when applying color filters which selectively transmit each of red color light, green color light, blue color light, and entire visible light to the color filters shown in FIG. 5A.

FIG. 5C is a diagram explaining a method of calculating a lacking color signal based on color signals outputted from the color filters shown in FIG. 5B.

MODE FOR CARRYING OUT THE INVENTION

Hereinafter, embodiments of an imaging device according to the present invention will be explained with reference to the drawings.

Embodiment 1

The present embodiment is an example where an imaging device according to the present invention is applied to a surrounding monitoring device which monitors around a vehicle, and presents an imaged image, an alarm and a warning lamp based on a recognition result of the imaged image to an occupant in the vehicle.

[Explanation of Schematic Structure of Imaging Device]

Figure 1:
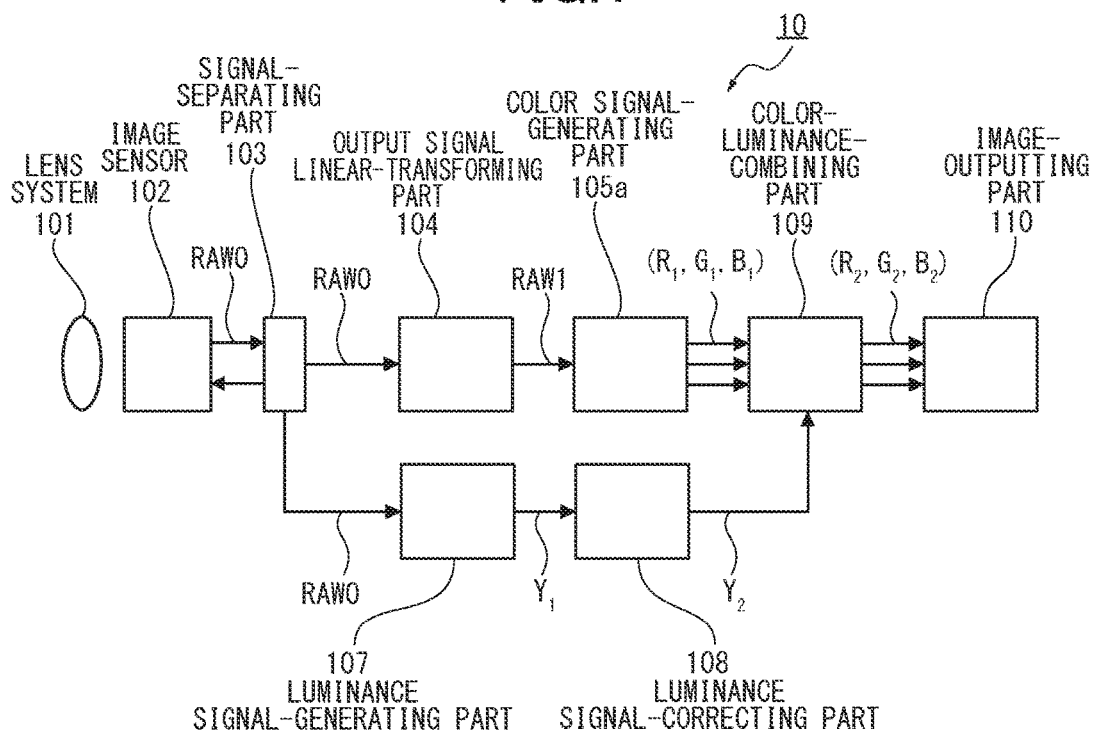
FIG. 1 is a block diagram showing a schematic structure of an imaging device in Embodiment 1 as one embodiment of the present invention.

Firstly, the structure of the imaging device will be explained with reference to the drawings. An imaging device 10 according to the present embodiment is mounted in a vehicle (not shown) as shown in FIG. 1. The imaging device 10 includes a lens system 101 which is used to observe a photographic subject, an image sensor 102, a signal-separating part 103, an output signal linear-transforming part 104, a color signal-generating part 105a, a luminance signal-generating part 107, a luminance signal-correcting part 108, a color-luminance-combining part 109, and an image-outputting part 110.

The lens system 101 is an optical system which guides light emitted from a photographic subject or light reflected from the photographic subject onto the later-described image sensor 102.

In a case of an in-vehicle monitoring imaging device, as the lens system 101, generally a pan-focus lens of narrow-angle, wide-angle, fish-eye, or the like is used. However, it is not only limited thereto, but also a lens system including a zoom mechanism and an auto-focus mechanism can be used, and a lens system including an aperture and a shutter can be used. Additionally, a lens system including various filters such as an optical low-pass filter, a band separation filter, a polarizing filter, and the like to improve an image quality and a color reproducibility can be used.

The image sensor 102 is constituted of a photoelectric conversion element. The photoelectric conversion element is constituted of a plurality of pixels. An image of a photographic subject observed through the lens system 101 is formed, and the photoelectric conversion element photoelectrically converts inputted light to an output voltage signal e in accordance with luminance of the light. The photoelectrically-converted output voltage signal e is digitized through an amplifier (not shown) included in the image sensor 102 and an AD converter (not shown) also included in the image sensor 102, and an output signal RAW0 is generated. As the output signal RAW0, for example, a signal digitized in 12-bit (0-4095) is outputted. As the image sensor 102, an element such as a CMOS image sensor, a CCD image sensor, or the like, which has a dynamic range of approximately 120-dB input luminance of at a maximum is used. Note that on a surface of each pixel constituting the image sensor 102, as described later, four types of filters are regularly arranged.

The signal-separating part 103 instructs the image sensor 102 a timing to perform imaging, receives the output signal RAW0 imaged by the image sensor 102, and separates the output signal RAW0 into two identical output signals RAW0, RAW0.

The output signal linear-transforming part 104 transforms one output signal RAW0 of the output signals RAW0, RAW0 separated in the signal-separating part 103 into a linearized output signal RAW1 having linearity by gradation conversion (linearization) processing. The contents of the conversion processing performed here will be described later.

The color signal-generating part 105a separates the linearized output signal RAW1 transformed in the output signal linear-transforming part 104 to four signals corresponding to each color of RGBC, performs linear interpolation with respect to blank pixels generated at the separation by using values of neighboring pixels, and generates linear color signals ($R_0$, $G_0$, $B_0$). And then, the color signal-generating part 104a separates an infrared light component from the linear color signals ($R_0$, $G_0$, $B_0$), generates infrared-separated color signals having linearity, and performs color correction and generates linear-corrected color signals ($R_1$, $G_1$, $B_1$). Additionally, the color signal-generating part 105a performs clipping processing with respect to a saturated pixel, and detects a saturated region in which color saturation occurs. Then the color signal-generating part 105a outputs suitable linear-corrected color signals ($R_1$, $G_1$, $B_1$) depending on whether it is a pixel which constitutes a saturated region or not. Note that the color signal-generating part 105a includes the detailed structure shown in FIG. 8; however, the contents of the color signal-generating part 105a and specific processing contents performed in the color signal-generating part 105a will be described later.

The luminance signal-generating part 107 generates a luminance signal $Y_1$ from the other output signal RAW0 of the output signals RAW0, RAW0 separated in the signal-separating part 103. The contents of the processing which is performed here will be described later.

The luminance signal-correcting part 108 corrects the luminance signal $Y_1$ generated in the luminance signal-generating part 107 as necessary, and generates a luminance-corrected signal $Y_2$. The contents of the processing which is performed here will be described later.

The color-luminance-combining part 109 combines the linear-corrected color signals ($R_1$, $G_1$, $B_1$) and the luminance-corrected signal $Y_2$, and generates video signals ($R_2$, $G_2$, $B_2$). The contents of the processing which is performed here will be described later.

The image-outputting part 110 is, for example, a display monitor which outputs the video signals ($R_2$, $G_2$, $B_2$) combined in the color-luminance-combining part 109.

Hereinafter, the operation of the imaging device 10 will be sequentially explained with reference to the drawings.

Figure 2:
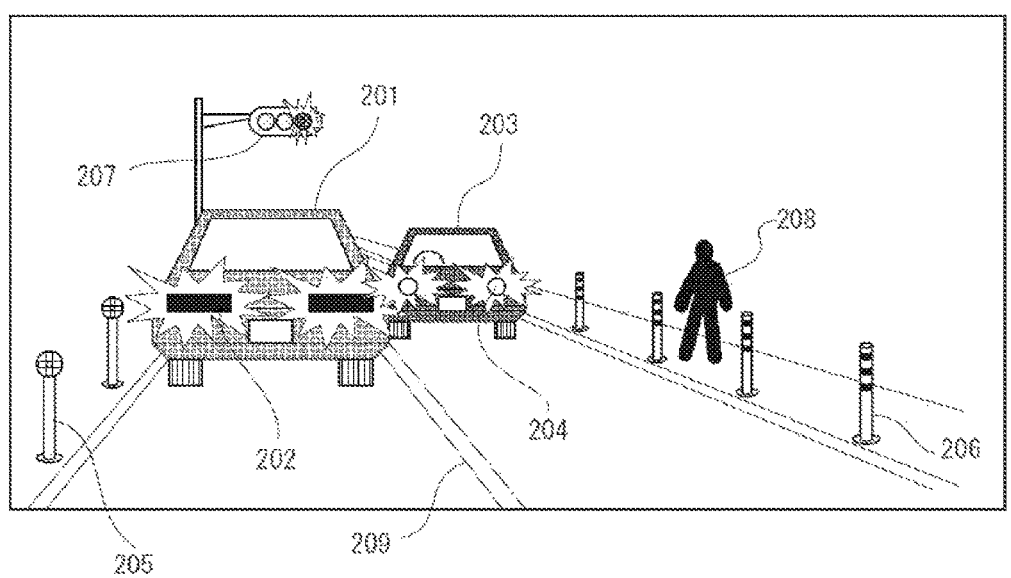
FIG. 2 is a diagram showing one example of a scene to which the present invention is applied.

Firstly, based on FIG. 2, a use scene of the imaging device 10 will be explained. In FIG. 2, an image obtained by using the imaging device 10 when a road at night is photographed is shown in a simulative manner. That is, a state where a preceding car 201, an oncoming car 203, reflectors 205, 206 of road signs, or the like, a traffic light 207, a pedestrian 208, a lane marker 209, and the like as photographic subjects on the road are imaged and picturized is shown.

Figure 3:
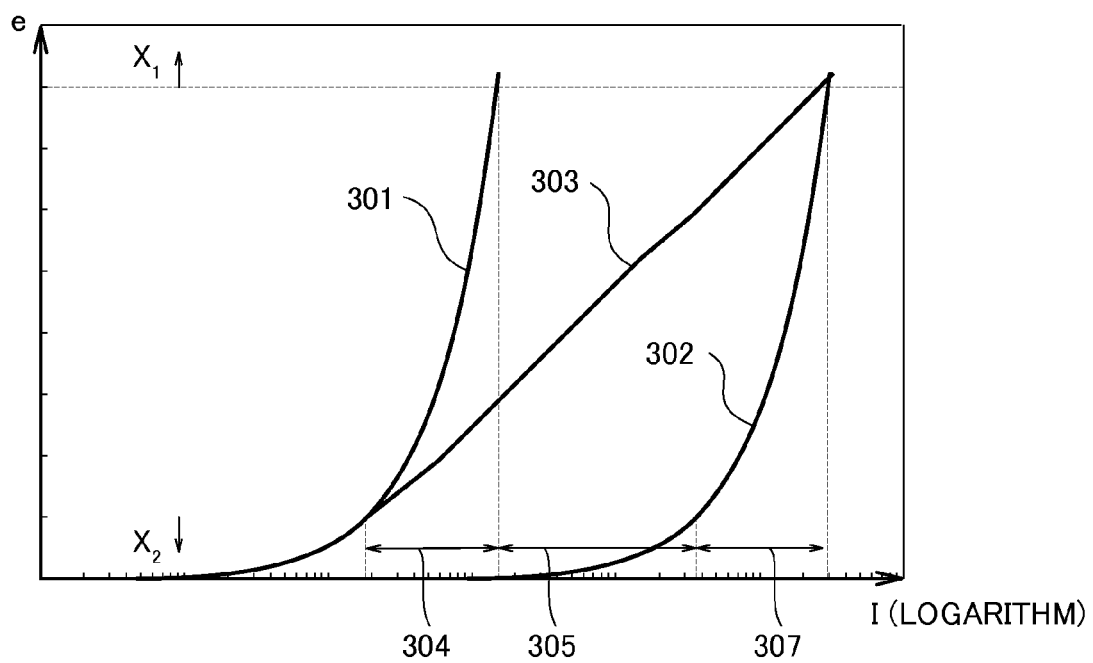
FIG. 3 is a diagram explaining an overview of input-output characteristics of an image sensor.

FIG. 3 shows a relationship between input luminance I and an output voltage signal e when the road shown in FIG. 2 is imaged and picturized by using a general image sensor having linear input-output characteristics.

That is, an input-output characteristic 301 when an exposure time is long and an input-output characteristic 302 when the exposure time is short as input-output characteristics when giving two different exposure times to the image sensor 102, and an input-output characteristic 303 considered to be able to generate a suitable color image without an occurrence of blown-out highlights or blocked-up shadows when the photographic subjects on the road are imaged and all the subjects are picturized are shown.

Since in such a night scene contrast between light and shade is extremely large, when imaging such a night scene by using an image sensor having a linear input-output characteristic, due to exceeding a limit of a dynamic range, there is a problem that phenomena referred to as blown-out highlights and blocked-up shadows occur.

That is, when determining an exposure time which allows the input-output characteristic 301 to be obtained and photographing so as to optimally show an input luminance range 304 in which a distribution frequency of the lane marker 209 and the pedestrian 208 is high at which a headlight of an own car and a road lighting do not strike or it is difficult to reflect the headlight of the own car and the road lighting, an output voltage signal e is saturated in an input luminance range 307 in which a distribution frequency of a headlight 204 is high or an input luminance range 305 in which a distribution frequency of a taillight 202 is high, and phenomena referred to as so-called blown-out highlights occur (a region $X_1$ in FIG. 3 represents a region in which the blown-out highlights occur).

Conversely, when determining an exposure time which allows the input-output characteristic 302 to be obtained and photographing so as to optimally show the input luminance range 307 in which the distribution frequency of the headlight 204 which is brightest is high, the output voltage signal e is extremely small in the input luminance range 304 in which the distribution frequency of the lane marker 209 and the pedestrian 208 is high and the input luminance range 305 in which the distribution frequency of the taillight 202 is high, and phenomena referred to as so-called blocked-up shadows occur (a region $X_2$ in FIG. 3 represents a region in which the blocked-up shadows occur).

Here, when generating an image based on the input-output characteristic 303, the output voltage signal e ranging from the lane marker 209 which is darkest to the headlight 204 which is brightest is in a range of one input-output characteristic 303 where no blown-out highlights or blocked-up shadows occur. An input-output characteristic of the image sensor 102 used in the present embodiment is approximately consistent with the input-output characteristic 303.

Next, the operation of the imaging device 10 will be sequentially explained.

[Explanation of Input-Output Characteristic of Image Sensor]

Figure 4A:
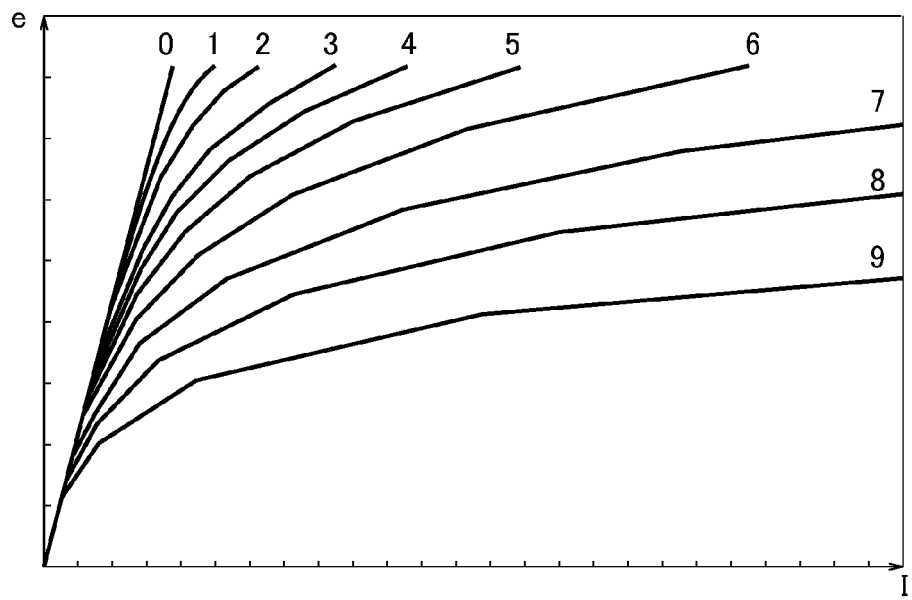
FIG. 4A is a diagram showing one example of input-output characteristics of an image sensor used in Embodiment 1 as one embodiment of the present invention.

A photoelectric conversion characteristic (hereinafter, referred to as an input-output characteristic) of the image sensor 102 includes a plurality of input-output characteristics as shown in FIG. 4A, and it is possible to change the input-output characteristic by changing a reset timing or a reset voltage of an electrical charge which is accumulated in each pixel of the image sensor 102 which receives incident light.

The input-output characteristic shown in FIG. 4A has a non-linear input-output characteristic in which an output voltage signal e varies non-linearly with respect to input luminance I. This is a well-known typical input-output characteristic of a logarithmic transformation type photoelectric conversion element.

Figure 4B:
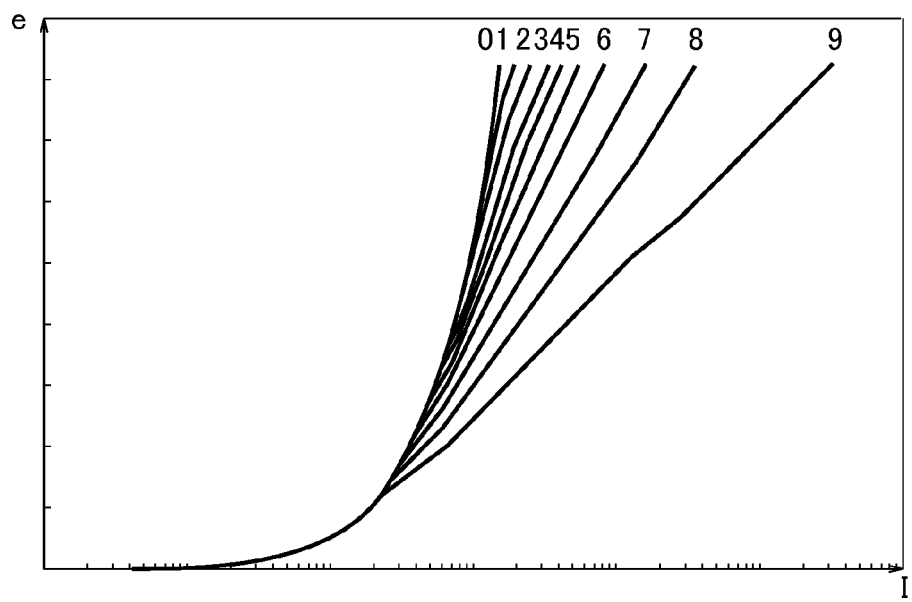
FIG. 4B is a diagram in which a horizontal axis shown in FIG. 4A is expressed in a logarithmic scale.

Note that FIG. 4B shows a graph in which the horizontal axis of the graph in FIG. 4A is expressed in a logarithmic scale, and shows that a dynamic range of the input luminance I which can be outputted without blown-out highlights or blocked-up shadows varies depending on a difference of an input-output characteristic.

And in FIGS. 4A and 4B, as a number allocated to an input-output characteristic becomes larger, the dynamic range of the input luminance I becomes wider.

Note that one of the plurality of input-output characteristics shown in FIG. 4A is selected by an exposure-controlling part (not shown in FIG. 1) embedded in the image sensor 102 in accordance with an imaging scene. For example, based on brightness of an imaging scene, an input-output characteristic is selected in which an image which is as high in contrast as possible is imaged without an occurrence of blown-out highlights and blocked-up shadows, and imaging is performed.

Specifically, in the exposure-controlling part, output statistic information of a histogram, or the like of an image per frame is calculated, the number of pixels of blown-out highlights and blocked-up shadows is obtained, and detection of the blown-out highlights and the blocked-up shadows is performed by threshold determination. In a case where the blown-out highlights are detected, an input-output characteristic in which a number allocated to an input-output characteristic is larger than that of the present input-output characteristic (a dynamic range is wide) is selected, and in a case where the blown-out highlights are not detected, an input-output characteristic in which a number allocated to an input-output characteristic is smaller than that of the present input-output characteristic (a dynamic range is narrow) is selected.

Additionally, in a case where the blocked-up shadows are detected, an exposure time is prolonged compared with the present exposure time, and in a case where the blocked-up shadows are not detected, an exposure time is shortened compared with the present exposure time.

The input-output characteristic shown in FIG. 3 corresponds to an input-output characteristic 9 in FIG. 4A, and an input-output characteristic 9 in FIG. 4B.

[Explanation of Filter Structure of Image Sensor]

The image sensor 102 two-dimensionally includes a plurality of pixels which output the output voltage signal e shown in FIG. 4A and FIG. 4B.

On a surface of a light-receiving surface of each pixel, as shown in FIG. 5A, three types of filters X, Y, Z which selectively transmit visible light per wavelength and have transmittances equal to each other with respect to near-infrared light, and a fourth filter T which represents the transmittance of the visible light per wavelength as a linear sum of the transmittances of the three types of filters and has transmittance equal to those of the three types of filters are regularly arranged.

Figure 7A:
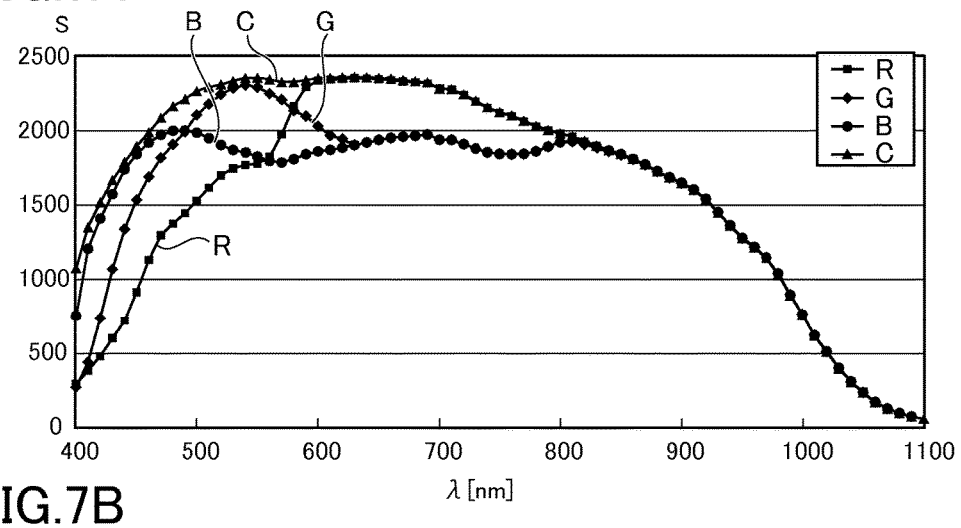
FIG. 7A is a diagram showing one example of spectral transmittance characteristics of filters used in Embodiment 1 as one embodiment of the present invention.

As an example of a filter having such a characteristic, FIG. 7A shows a spectral sensitivity S which is an output value per wavelength of the image sensor 102 on which an RGB filter, which is used in many image sensors, is arranged. That is, as shown in FIG. 5B, the three types of filters X, Y, Z correspond to a red color filter R, a green color filter G, and a blue color filter B, respectively, and the fourth filter T corresponds to a clear filter C which transmits entire visible light.

In FIG. 7A, a border between visible light and near-infrared light is unclear; however, generally it can be considered to be a wavelength region of approximately 70 nm-approximately 850 nm, and in a wavelength region higher than this wavelength region, there occurs no difference in spectral transmittance of the four types of filters, and therefore, output voltage signals e of the pixels onto which each light transmitted through the four types of filters is incident gradually approach each other.

The present embodiment is characterized in that characteristics of the four types of filters are utilized, and based on the characteristic of the image sensor 102, a point (in an example of FIG. 7A, around a wavelength of 840 nm) where output values of the four types of filters sufficiently approach each other and are coincident with each other is taken as a border between a visible light region and a near-infrared light region, and from the output voltage signals e of the image sensor 102, a component (visible light component) included in the visible light region is maintained, and only a component (near-infrared light component) included in the near-infrared light region is separated and removed.

Next, the characteristics of the four types of filters X, Y, Z, T will be explained. When transmittances of the four types of filters X, Y, Z, T in an arbitrary wavelength of the visible light region are taken as $X_T$, $Y_T$, $Z_T$, $T_T$, respectively, a relationship among them is expressed as (Expression 1).

$$T_T = \alpha X_T + \beta Y_T + \gamma Z_T \quad \text{(Expression 1)}$$

Transmittance $T_T$ of the fourth filter T can be thus expressed by a linear sum of transmittances $X_T$, $Y_T$, $Z_T$ of the three types of filters X, Y, Z, and a coefficient $\alpha$, a coefficient $\beta$, and a coefficient $\alpha$ which are either positive or negative are uniquely determined. That is, the imaging device 10 needs to use four color filters which satisfy a condition of (Expression 1); however, as described above, it is possible to achieve by using an RGB filter used in many image sensors. And additionally, as the fourth filter T, a clear filter C which transmits an entire visible light region can be used.

Figure 7B:
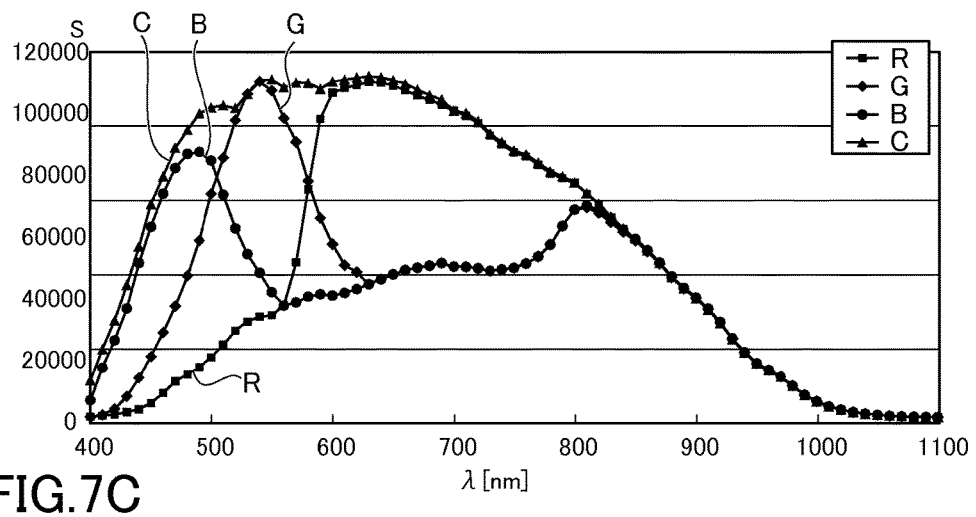
FIG. 7B shows one example of spectral transmittance characteristics after gradation-converting the spectral transmittance characteristics shown in FIG. 7A such that input luminance of the image sensor and an output signal establish a linear relationship.

From output values with respect to wavelengths λ of the image sensor 102 using the four types of filters, spectral sensitivities S as shown in FIG. 7A are obtained, and additionally, in later-described gradation conversion processing (linear transformation processing), by transforming a relationship between input luminance to the image sensor 102 and output voltage signals e outputted from the image sensor 102 into a linear relationship, spectral sensitivities S shown in FIG. 7B are obtained. And from the spectral sensitivities S shown in FIG. 7B, it is possible to calculate values of the coefficients $\alpha$, $\beta$, $\gamma$ which satisfy (Expression 1).

The values of the coefficients $\alpha$, $\beta$, $\gamma$ can be set by determining optimal values of the coefficients $\alpha$, $\beta$, $\gamma$ to be in an allowable range with respect to a true value by using a least-squares method from the spectral sensitivities S measured with respect to light having a plurality of different wavelengths λ. And the present embodiment can be applied to not only an RGBC filter array but also an array of arbitrary four types of filters which can be expressed by a relational expression of (Expression 1).

In the image sensor 102, an output signal e generated through the RGBC filter is digitized, and converted to an output signal RAW0 (12-bit). And, firstly, in the signal-separating part 103, separation processing which separates it into two output signals used in color signal processing and luminance signal processing is performed. Each of the two output signals after separation is identical to the output signal RAW0 before separation.

[Explanation of Linear Transformation Processing]

Next, with respect to the output signal RAW0 which is used in the color signal processing of the two output signals RAW0, RAW0 separated in the signal-separating part 103, the linear transformation processing (linearization) is performed in the output signal linear-transforming part 104. That is, as shown in FIG. 6, assume that the image sensor 102 has a predicted linear characteristic 612 in which the output voltage signal e of the photoelectric conversion element in the image sensor 102 varies linearly with respect to the input luminance I, and a signal portion corresponding to a region in which the input luminance I and the output voltage signal e establish a non-linear relationship is transformed into a signal which has a linear relationship.

Figure 6:
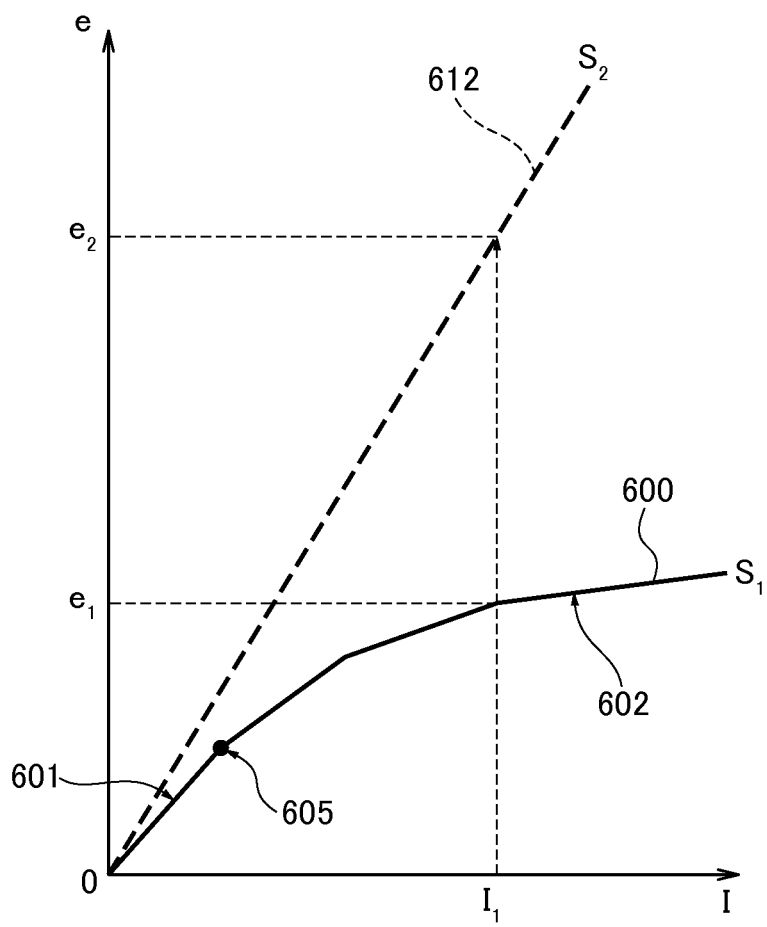
FIG. 6 is a diagram explaining signal transformation processing performed in an output signal linear-transforming part in Embodiment 1 as one embodiment of the present invention.

As shown by the input-output characteristic 600 in FIG. 6, the image sensor 102 has a linear characteristic 601 in a region in which the input luminance I is small, and in the region, outputs an output signal which varies linearly with respect to the input luminance I.

Additionally, the image sensor 102 has a non-linear characteristic 602 in a region in which the input luminance I is large, and in the region, outputs an output signal which varies non-linearly with respect to the input luminance I.

And the region having the linear characteristic 601 and the region having the non-linear characteristic 602 continue at a connection point 605. Note that the output voltage signal e outputted by the photoelectric conversion element in the image sensor 102 is a first output signal $S_1$.

At this time, throughout an entire input luminance range of the image sensor 102, assume that linearity of an input-output characteristic is established. That is, as shown by a dotted line in FIG. 6, assume that an input-output characteristic shows the predicted linear characteristic 612. And an output signal which is predicted to be outputted from the image sensor 102 based on the predicted linear characteristic 612 is a second output signal $S_2$.

In the output signal linear-transforming part 104, when assuming that the input-output characteristic shows the predicted linear characteristic 612, processing is performed in which the first output signal $S_1$ outputted from the image sensor 102 is transformed into the second output signal $S_2$ which is predicted to be outputted from the image sensor 102.

That is, in a case of FIG. 6, when assuming that an output voltage signal which is obtained by the input-output characteristic 600 with respect to input luminance $I_1$ is an output voltage signal $e_1$ and an input-output characteristic shows the predicted linear characteristic 612, and if an output voltage signal which is predicted with respect to the input luminance $I_1$ is an output voltage signal $e_2$, processing is performed in which the output voltage signal $e_1$ is multiplied by $e_2/e_1$.

There are various methods of linearization; however, for example, linear transformation can be performed by use of a LUT (Lookup Table). That is, input-output characteristics of the image sensor 102 are measured as many as the number of all numbers of input-output characteristics beforehand, a correspondence relationship between the output voltage signal $e_1$ which is obtained with respect to a certain input luminance I and the output voltage signal $e_2$ which is predicted when assuming that the input-output characteristic shows a linear characteristic is stored in the LUT, and when gradation conversion processing (linear transformation processing) is performed, gradation conversion can be performed with reference to a corresponding value stored in the LUT from a number of the present input-output characteristic and a value of the output voltage signal $e_1$ actually measured.

In the LUT generated at this time, numbers of the input-output characteristics of the image sensor 102, output voltage values which are obtained by the input-output characteristic 600, and output voltage values which are linearly transformed are stored.

Note that the numbers of the input-output characteristics of the image sensor 102, the output signal RAW0 of the imaging device 10 and the LUT used for performing the gradation conversion are all treated as digital information. In Embodiment 1, regarding the number of bits which is necessary for storing all the information, for example, in a case of using the image sensor 102 having the input-output characteristics shown in FIG. 4A, since the total number of the input-output characteristics is 10, the number of bits which is necessary for fully expressing the input-output characteristics is 4-bit, the number of bits which is necessary for the output signal RAW0 of the image sensor 102 is 12-bit, and the number of bits which is necessary for the LUT (output voltage value after the linear transformation) is 20-bit (>120 dB), considering that a dynamic range of the input luminance I is approximately 120 dB at a maximum ($1:10^6$).

Then, by the gradation conversion processing (linear transformation processing), a 20-bit linearized output signal RAW1 is obtained from the 12-bit output signal RAW0.

As the methods of performing the gradation conversion processing, various methods other than the above such as a method in which a position of a knee point as a folding point in the input-output characteristic of the image sensor 102 is predicted and piecewise linear transformation is performed, a method in which approximation is performed by a logarithmic characteristic and transformation by an expression is performed, and the like are considered; however, all the methods result in transformation of the input-output characteristic into a linear relationship for the color signal processing.

[Explanation of Linear Interpolation-processing of Color Signal]

Next, color reproduction processing performed in the color signal-generating part 105a will be explained with reference to FIG. 8.

Figure 8:
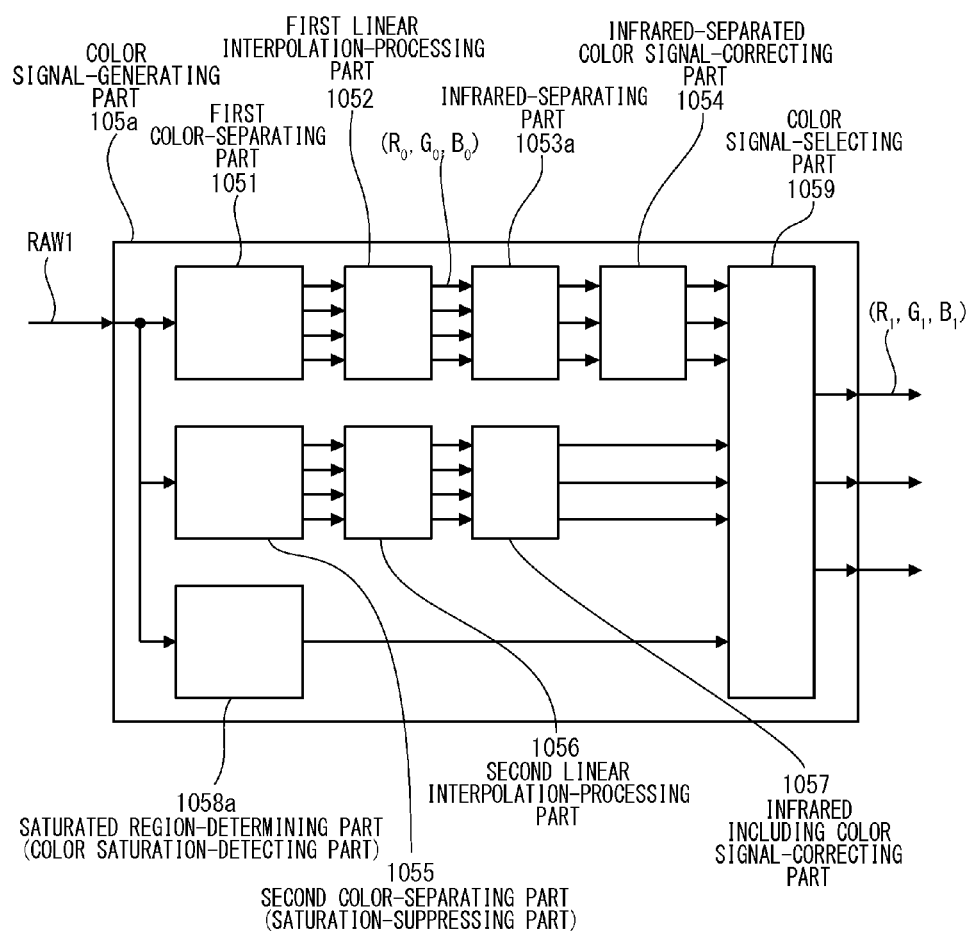
FIG. 8 is a diagram explaining a detailed structure of a color signal-generating part in Embodiment 1 as one embodiment of the present invention.

FIG. 8 is a diagram showing a detailed structure of the color signal-generating part 105a. That is, the color signal-generating part 105a includes a first color-separating part 1051, a first linear interpolation-processing part 1052, an infrared-separating part 1053a, an infrared-separated color signal-correcting part 1054, a second color-separating part 1055 (saturation-suppressing part), a second linear interpolation-processing part 1056, an infrared including color signal-correcting part 1057, a saturated region-determining part 1058a (color saturation-detecting part), and a color signal-selecting part 1059.

The linearized output signal RAW1 (20-bit) transformed by the output signal linear-transforming part 104 (see FIG. 1) is separated into three signals, and they are inputted to the first color-separating part 1051, the second color-separating part 1055 (saturation-suppressing part), and the saturated region-determining part 1058a (color saturation-detecting part). At this time, each of the three signals after separation is identical to the linearized output signal RAW1 before separation.

The first color-separating part 1051 separates the linearized output signal RAW1 into four color signals corresponding to the colors constituting the linearized output signal RAW1. At this time, an output of a pixel without a color signal is 0 (blank).

The first linear interpolation-processing part 1052 linearly-interpolates a pixel value which is estimated to be observed in a blank pixel (pixel without a color signal) generated when separating a signal in the first color-separating part 1051 by use of neighboring pixel values. And in each of all the pixels, four linear color signals ($R_0$, $G_0$, $B_0$, $C_0$) are generated.

A method of the linear interpolation will be specifically explained with reference to FIG. 5C. In a filter arranged as shown in FIG. 5C, for example, on a surface of a pixel denoted by $B_{22}$, a filter which transmits blue color light is arranged. Therefore, from the pixel denoted by $B_{22}$, only an output voltage signal e corresponding to blue color is obtained.

Accordingly, signals corresponding to red color light, green color light, and white color light which are estimated to be outputted from the pixel denoted by $B_{22}$ need to be calculated by interpolating output voltage signals e around the pixel denoted by $B_{22}$.

For example, a red color light component which is estimated to be outputted from the pixel denoted by $B_{22}$ is calculated by applying an average value of output voltage values e of pixels denoted by $R_{11}$, $R_{13}$, $R_{31}$ and $R_{33}$ as pixels on which a red color filter R is each arranged of neighboring pixels of the pixel denoted by $B_{22}$.

Additionally, a green color light component which is estimated to be outputted from the pixel denoted by $B_{22}$ is calculated by applying an average value of output voltage values e of pixels denoted by $G_{12}$ and $G_{32}$ as pixels on which a green color filter G is each arranged of neighboring pixels of the pixel denoted by $B_{22}$.

And a white color light component which is estimated to be outputted from the pixel denoted by $B_{22}$ is calculated by applying an average value of output voltage values e of pixels denoted by $C_{21}$ and $C_{23}$ as pixels on which a clear filter C is each arranged of neighboring pixels of the pixel denoted by $B_{22}$.

Note that at this time, not only is interpolation simply performed but also a lacking color signal can be calculated by performing digital filtering for frequency selection by use of a digital filter such as a low-pass filter, a band-pass filter, or the like.

[Explanation of Infrared Light Separation Processing]

The infrared-separating part 1053a performs infrared separation processing with respect to the four linear color signals ($R_0$, $G_0$, $B_0$, $C_0$) obtained in the first linear interpolation-processing part 1052 by a linear matrix. A matrix operation used for performing the infrared separation processing is specifically shown by (Expression 2) and (Expression 3).

$$\begin{bmatrix} X \\ Y \\ Z \end{bmatrix} = M_1 \begin{bmatrix} X+i \\ Y+i \\ Z+i \\ T+i \end{bmatrix}$$ (Expression 2)

$$M_1 = \frac{1}{\alpha+\beta+\gamma-1} \begin{bmatrix} \beta+\gamma-1 & -\beta & -\gamma & 1 \\ -\alpha & \alpha+\gamma-1 & -\gamma & 1 \\ -\alpha & -\beta & \alpha+\beta-1 & 1 \end{bmatrix}$$ (Expression 3)

In (Expression 2), a matrix with 4 rows and 1 column on the right on the right-hand side shows four color signals including near-infrared light after linear interpolation, and a matrix on the left-hand side shows three color signals after near-infrared light separation. For example, in a case of a color signal X, since a signal includes a near-infrared light component in addition to a visible light component, a visible light component included in the signal is expressed by X, a near-infrared light component is expressed by i, and an amount of the signal is expressed by X+i. The same applies to Y, Z and T, except that a visible light component is different from X.

Here, by use of (Expression 1), when the right-hand side of (Expression 2) is expanded and (Expression 3) is substituted, the left-hand side of (Expression 2) is obtained. That is, by calculating coefficients α, β, γ of (Expression 1) and deriving (Expression 3) beforehand, it is possible to calculate infrared-separated linear color signals by performing a comparatively simple linear operation with respect to the linear color signals ($R_0$, $G_0$, $B_0$, $C_0$) including near-infrared light.

Figure 7C:
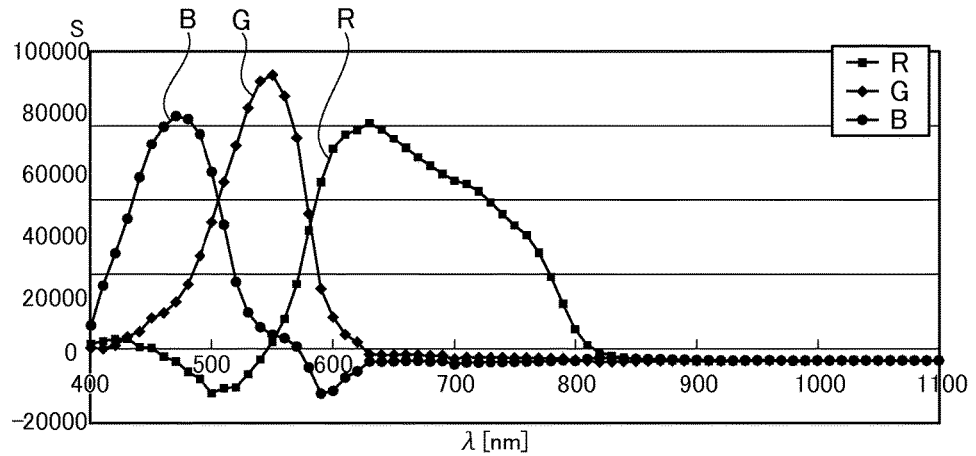
FIG. 7C shows one example of spectral transmittance characteristics after separating a near-infrared light component from the signal shown in FIG. 7B.

In a case of actually using the image sensor 102 including an RGBC filter, when X=R, Y=G, Z=B and T=C, and the coefficients α, β, γ are calculated from the spectral sensitivity characteristics shown in FIG. 7B, α=0.5, β=0.6 and γ=0.6. And when applying later-described color reproduction processing, color signals equal to color signals obtained by an image sensor having spectral sensitivity characteristics shown in FIG. 7C are obtained by calculation. Therefore, resultant color signals are color signals in which near-infrared light components are almost separated and removed.

The infrared-separated color signal-correcting part 1054 performs color signal correction processing such that color to be reproduced by the imaging device 10 becomes a target color by a technique (a linear matrix operation based on target color) executed by the imaging device 10 using an image sensor having a general linear characteristic.

Specifically, in the infrared-separated color signal-correcting part 1054, with respect to three infrared-separated color signals outputted from the infrared-separating part 1053a, a linear matrix operation is performed by use of (Expression 4), correction is performed such that color to be reproduced by a non-saturated pixel (normal pixel) in which an output is not saturated becomes target color, and three linear-corrected color signals (Xc, Yc, Zc) which have been corrected are outputted.

$$\begin{bmatrix} Xc \\ Yc \\ Zc \end{bmatrix} = \begin{bmatrix} x11 & x12 & x13 \\ y11 & y12 & y13 \\ z11 & z12 & z13 \end{bmatrix} \begin{bmatrix} X \\ Y \\ Z \end{bmatrix}$$ (Expression 4)

In particular, linear-corrected color signals obtained from the image sensor 102 including the above-described RGBC filter are referred to as ($R_1$, $G_1$, $B_1$). The linear-corrected color signals ($R_1$, $G_1$, $B_1$) can be calculated by substitution of X=R, Y=G, Z=B and T=C in (Expression 4).

[Explanation of Clipping Processing]

Likewise to the first color-separating part 1051, the linearized output signal RAW1 is inputted and separated into four color signals (0 which expresses blank is inserted to a pixel without a color signal); however, before separation, the second color-separating part 1055 (saturation-suppressing part) performs clipping with respect to a saturation signal level (in a case of 12-bit, 4095) by use of a clip level predetermined per color signal.

Clipping processing is processing which sets a pixel value of the linearized output signal RAW1 to a predetermined value when the pixel value of the linearized output signal RAW1 exceeds the predetermined value.

Figure 9A:
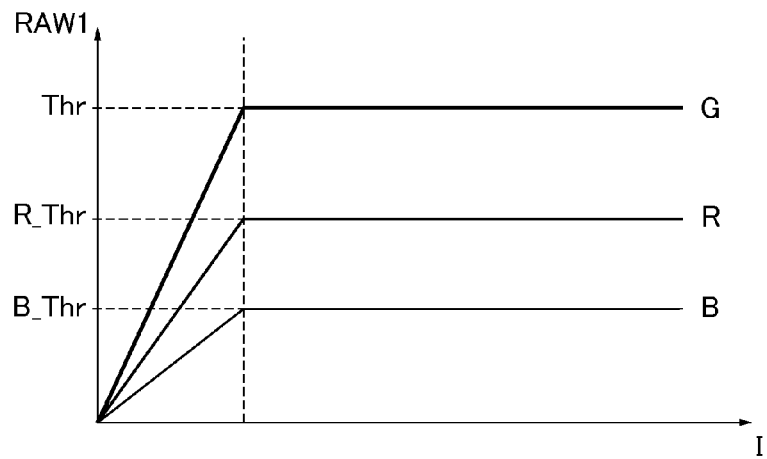
FIG. 9A is a diagram explaining an overview of clipping processing.

One example of the clipping processing is shown in FIG. 9A. For example, when a signal outputted from a pixel on which a green color filter G is arranged is larger than a predetermined value Thr, the predetermined value Thr is forcibly given to the pixel on which the green color filter G is arranged.

And at this time, when white color light of the same luminance is incident onto a pixel on which a red color filter R is arranged, a predetermined value R_Thr is set with respect to the pixel on which the red color filter is arranged such that a signal outputted from the pixel on which the red filter is arranged is also saturated. Here, a value of R_Thr is calculated by (Expression 5).

$R\_Thr = Thr \times G\_Gain/R\_Gain$ (Expression 5)

Here, each of G_gain and R_Gain is a parameter which adjusts a color temperature, and G_Gain is a G gain which expresses intensity of green color, and R_gain is an R gain which expresses intensity of red color.

And likewise, a predetermined value B_Thr is set with respect to a pixel on which a blue color filter is arranged. Here, a value of B_Thr is calculated by (Expression 6).

$B\_Thr = Thr \times R\_Gain/B\_Gain$ (Expression 6)

Here, B_Gain is a parameter which adjusts a color temperature, and is a B gain which expresses intensity of blue color.

Then, in the second linear interpolation-processing part 1056, similar linear interpolation processing to the first linear interpolation-processing part 1052 is performed. The infrared including color signal-correcting part 1057 performs a linear matrix operation with respect to four color signals including near-infrared light outputted from the second linear interpolation-processing part 1056 by use of (Expression 7), corrects the four color signals such that color to be reproduced in a saturated region becomes target color, and outputs three signals of (Xs, Ys, Zs) of four linear-corrected color signals (Xs, Ys, Zs, Ts) which have been corrected.

$$\begin{bmatrix} Xs \\ Ys \\ Zs \\ Ts \end{bmatrix} = \begin{bmatrix} x'11 & x'12 & x'13 & x'14 \\ y'11 & y'12 & y'13 & y'14 \\ z'11 & z'12 & z'13 & z'14 \\ t'11 & t'12 & t'13 & t'14 \end{bmatrix} \begin{bmatrix} X+i \\ Y+i \\ Z+i \\ T+i \end{bmatrix}$$ (Expression 7)

Note that in a case of the image filter 102 including the above-described RGBC filter, in (Expression 7), by substitution of X=R, Y=G, Z=B and T=C, linear-corrected color signals ($R_1$, $G_1$, $B_1$) are calculated. The linear-corrected color signals ($R_1$, $G_1$, $B_1$) thus calculated are infrared non-separated color signals in which near-infrared light is not separated.

[Explanation of Saturated Region Determination Processing]

The color signal-selecting part 1059 performs determination of selecting either of the two types of the linear-corrected color signals (infrared-separated color signals, infrared non-separated color signals) generated in parallel per pixel to use. Therefore, firstly, in the saturated region-determining part 1058a (color saturation-detecting part), with respect to the linearized output signal RAW1, a binary signal which only expresses a saturated pixel, or a neighboring pixel of the saturated pixel (pixel affected by the saturated pixel by linear interpolation) is generated.

Specifically, with respect to a binary image in which a pixel determined to be saturated in which a saturation level is equal to or greater than a saturation signal level is taken as 1 and pixels other than the above are taken as 0, dilation (expansion) processing is performed in accordance with a kernel size when performing the linear interpolation processing, and a binary image signal resulting from the dilation processing is inputted to the color signal-selecting part 1059 as a saturated pixel signal which expresses a saturated pixel. At this time, by performing the dilation processing of a region, neighboring pixels which are considered to be affected by a saturated pixel are extracted with the saturated pixel.

The color signal-selecting part 1059 performs selection of either of the two types of the color signals to be outputted depending on whether a target pixel is extracted as a saturated pixel or a neighboring pixel of the saturated pixel. That is, when the binary image signal is 0, it is not determined to be a saturated pixel, or a neighboring pixel of the saturated pixel, and infrared-separated linear-corrected color signals ($R_1$, $G_1$, $B_1$) are selected.

On the other hand, when the binary image signal is 0, it is determined to be a saturated pixel or a neighboring pixel of the saturated pixel, and infrared non-separated linear-corrected color signals ($R_1$, $G_1$, $B_1$) in which the clipping processing has been performed are selected.

Thus, from the linearized output signal RAW1 (20-bit), three linear-corrected color signals ($R_1$, $G_1$, $B_1$) (signed 21-bit) in which a near-infrared light component is separated so as to be consistent with human color vision characteristics, and colorfulness, hue, and the like are adjusted are selected and outputted.

Figure 9B:
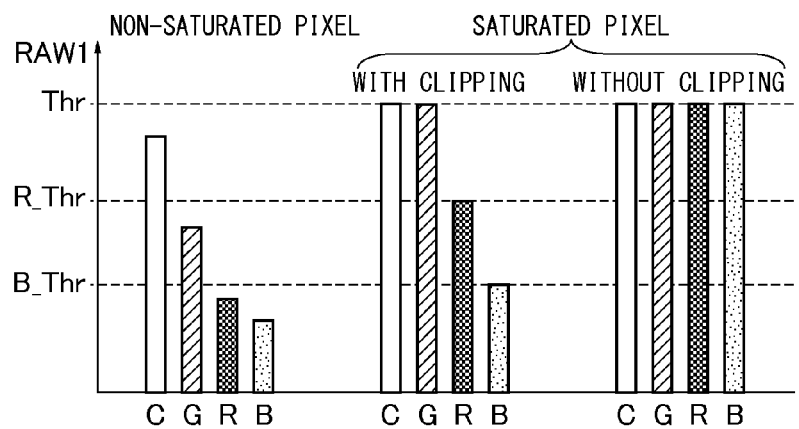
FIG. 9B is a diagram explaining an example to which the clipping processing is applied, and an example of gradation before performing color correction.
Figure 9C:
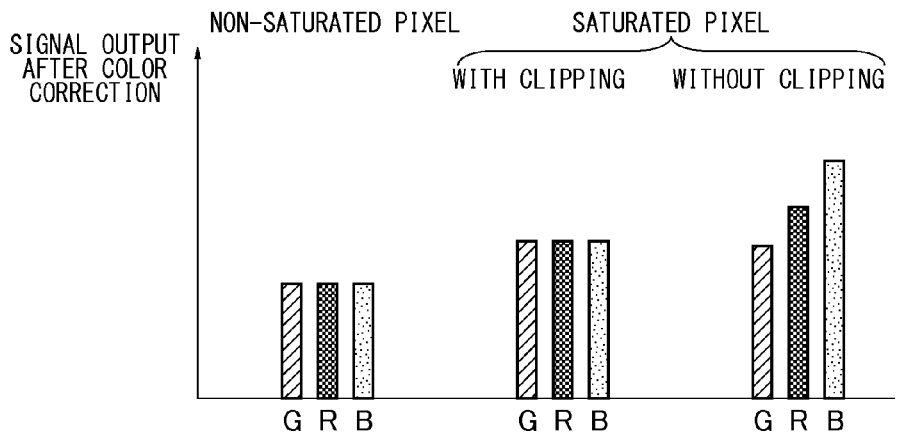
FIG. 9C is an example of gradation after performing color correction.

The selection of color signal will be explained with reference to FIGS. 9B and 9C. As shown in FIGS. 9B and 9C, in a non-saturated pixel, or a saturated pixel in which clipping processing has been performed, a signal after color correction becomes achromatic. On the other hand, in a saturated pixel in which clipping processing is not performed, GB balance is lost when performing color correction, and a color shift occurs as shown in FIG. 9C. Therefore, as described above, in a case of a saturated pixel signal, it is possible to prevent an occurrence of a color shift by selecting a color signal in which clipping processing has been performed.

[Explanation of Color Reproduction Processing by Color-Luminance Combining]

An output signal RAW0 which is not used in the color signal processing of the two output signals RAW0, RAW0 separated by the signal-separating part 103 is used in luminance signal processing.

The luminance signal-generating part 107 generates a luminance signal $Y_1$ (12-bit) from the output signal RAW0.

The contents of the processing are similar to the processing performed in the output signal linear-transforming part 104, except that color separation is not performed, and it is possible to perform digital filtering for frequency selection by use of a digital filter such as a low-pass filter, a band-pass filter, or the like.

The luminance signal-correcting part 108 performs contrast adjustment such as gamma correction, histogram correction, or the like with respect to the luminance signal $Y_1$, and generates a luminance-corrected signal $Y_2$ (12-bit).

Then, by use of the linear-corrected color signals and the luminance-corrected signal, in the color-luminance-combining part 109, video signals which are outputted to the image-outputting part 110 are generated.

[Explanation of Color-Luminance-combining Processing]

Hereinafter, by use of the linear-corrected color signals ($R_1$, $G_1$, $B_1$) and the luminance-corrected signal $Y_2$ obtained from the image sensor 102 including the RGBC filter, a method of generating video signals ($R_2$, $G_2$, $B_2$) will be sequentially explained.

Figure 10:
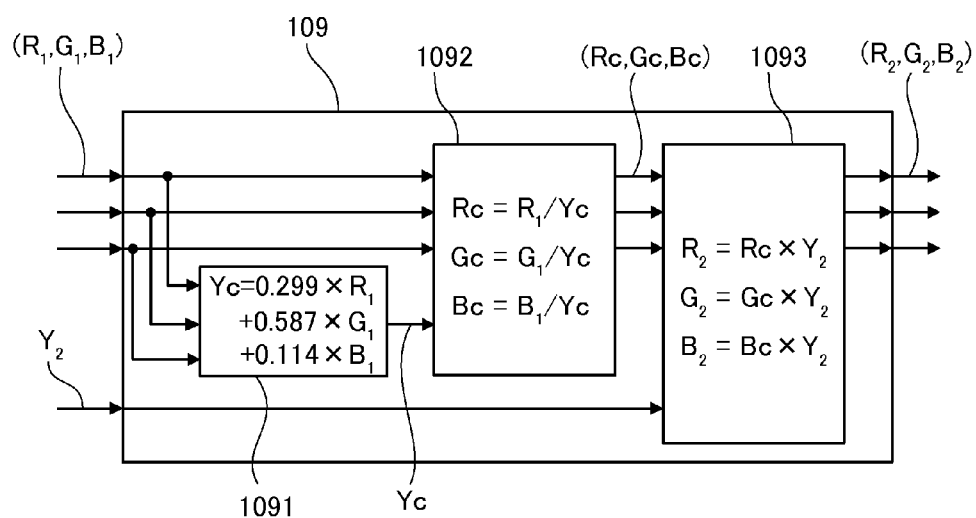
FIG. 10 is a diagram explaining combining processing of a color signal and a luminance signal performed in a color-luminance-combining part in Embodiment 1 as one embodiment of the present invention.

FIG. 10 shows an internal structure of the color-luminance-combining part 109. Firstly, the linear-corrected color signals ($R_1$, $G_1$, $B_1$) are each separated into two signals, and in a processing block 1091, from each one of the linear-corrected color signals ($R_1$, $G_1$, $B_1$) separated in two, a luminance component Yc of those signals is calculated by use of (Expression 8).

$$Yc = 0.299 \times R_1 + 0.587 \times G_1 + 0.114 \times B_1, \quad \text{(Expression 8)}$$

In (Expression 8), each coefficient multiplied to each component of the linear-corrected color signals ($R_1$, $G_1$, $B_1$) is one example of a value calculated as a transformation coefficient when transforming RGB chromaticity into luminance.

In arithmetic of (Expression 8), a range of value of the linear-corrected color signals ($R_1$, $G_1$, $B_1$) (signed 21-bit) which are inputted is wide, and therefore, the linear-corrected color signals ($R_1$, $G_1$, $B_1$) are transformed into floating point, and floating-point arithmetic is performed.

Next, in a processing block 1092, as shown by (Expression 9) to (Expression 11), by a value of the luminance component Yc derived by (Expression 8), each component of the linear-corrected color signals ($R_1$, $G_1$, $B_1$) is divided, normalization of the linear-corrected color signals ($R_1$, $G_1$, $B_1$) is performed, and normalized color signals (Rc, Gc, Bc) are generated. This arithmetic is performed as the floating-point arithmetic, and the result is outputted as a 12-bit integer.

$$Rc = R_1/Yc \quad \text{(Expression 9)}$$

$$Gc = G_1/Yc \quad \text{(Expression 10)}$$

$$Bc = B_1/Yc \quad \text{(Expression 11)}$$

Then, in a processing block 1093, as shown by (Expression 12) to (Expression 14), the normalized color signals (Rc, Gc, Bc) are multiplied by the luminance-corrected signal $Y_2$ generated by the luminance signal-correcting part 108, and the video signals ($R_2$, $G_2$, $B_2$) which are output signals of the color-luminance-combining part 109 are generated.

$$R_2 = Xc \times Y_2 \quad \text{(Expression 12)}$$

$$G_2 = Yc \times Y_2 \quad \text{(Expression 13)}$$

$$B_2 = Zc \times Y_2 \quad \text{(Expression 14)}$$

Here, it must be noted that the normalized color signals (Rc, Gc, Bc) are signals having a linear characteristic and the luminance-corrected signal $Y_2$ is a signal having a non-linear characteristic, and therefore, the video signals ($R_2$, $G_2$, $B_2$) in which the normalized color signals (Rc, Gc, Bc) and the luminance-corrected signal $Y_2$ are combined are signals having a non-linear characteristic.

At this time, among the linear-corrected color signals ($R_1$, $G_1$, $B_1$), the luminance-corrected signal $Y_2$ and the video signals ($R_2$, $G_2$, $B_2$), relational expressions of (Expression 15) and (Expression 16) are established. In this regard, influence due to an error in accordance with reduction of a bit width when calculating is sufficiently small.

$$Y_2 = 0.299 \times R_2 + 0.587 \times G_2 + 0.114 \times B, \quad \text{(Expression 15)}$$

$$R_1 : G_1 : B_1 = R_2 : G_2 : B_2 \quad \text{(Expression 16)}$$

(Expression 15) expresses that the video signals ($R_2$, $G_2$, $B_2$) and the luminance-corrected signal $Y_2$ establish a relationship between three primary color vectors and luminance vectors constituted of the three primary color vectors, and the video signals ($R_2$, $G_2$, $B_2$) maintain luminance information of a wide dynamic range which the luminance-corrected signal $Y_2$ has.

Additionally, (Expression 16) expresses that a color composition ratio (hue) of the linear-corrected color signals ($R_1$, $G_1$, $B_1$) and that of the video signals ($R_2$, $G_2$, $B_2$) are the same, and additionally, together with (Expression 15), signal strengths (colorfulness) with respect to the luminance signal are the same. That is, it expresses that when transforming the linear characteristic into the non-linear characteristic, color reproducibility which the linear color signals (R0, G0, B0) have is maintained.

The video signals ($R_2$, $G_2$, $B_2$) thus generated are displayed on the image-outputting part 110 and shown to the occupant in the vehicle.

[Explanation of Processing Flow]

Next, with reference to a flow diagram shown in FIG. 11, series of processing flow of Embodiment 1 will be explained.

(Step S10)

The image sensor 102 is instructed in an imaging timing from the signal-separating part 103, and imaging is performed.

(Step S12)

The image sensor 102 receives light transmitted through the lens system 101, performs photoelectric conversion, and outputs an output signal RAW0.

(Step S14)

In the signal-separating part 103, the output signal RAW0 is separated into two identical output signals RAW0, RAW0.

(Step S16)

In the output signal linear-transforming part 104, one output signal RAW0 is transformed into a linearized output signal RAW1 having linearity.

(Step S18)

Linear color signals ($R_0$, $G_0$, $B_0$) are generated such that in the first color-separating part 1051, the linearized output signal RAW1 is separated into four signals corresponding to colors of RGBC, and in the first linear interpolation-processing part 1052, with respect to a blank pixel generated at the time of separation, linear interpolation is performed by use of values of neighboring pixels.

(Step S20)

In the infrared-separating part 1053*a*, an infrared light component is separated from the linear color signals $R_0$, $G_0$, $B_0$, and infrared-separated color signals are generated. And additionally, in the infrared-separated color signal-correcting part 1054, color correction is performed, and linear-corrected color signals ($R_1$, $G_1$, $B_1$) are generated.

(Step S22)

In the second color-separating part 1055 (saturation-suppressing part), clipping processing is performed, and additionally, in the second linear interpolation-processing part 1056, linear color signals ($R_0$, $G_0$, $B_0$, $C_0$) are generated.

(Step S24)

In the infrared including color signal-correcting part 1057, a linear matrix operation is performed with respect to the four color signals outputted from the second linear interpolation-processing part 1056, and four color-corrected linear-corrected color signals are generated.

(Step S26)

In the saturated region-determining part 1058*a* (color saturation-detecting part), saturation determination is performed with respect to the linearized output signal RAW1, and a binary image which only expresses a saturated pixel, or a neighboring pixel of the saturated pixel is generated.

(Step S28)

In the luminance signal-generating part 107, a luminance signal $Y_1$ is generated from the other output signal RAW0.

(Step S30)

In the luminance signal-correcting part 108, contrast adjustment such as gamma correction, histogram correction, or the like is performed with respect to the luminance signal $Y_1$, and a luminance-corrected signal $Y_2$ is generated.

(Step S32)

In the color-luminance-combining part 109, the linear-corrected color signals ($R_1$, $G_1$, $B_1$) and the luminance-corrected signal $Y_2$ are combined, and video signals ($R_2$, $G_2$, $B_2$) are generated.

(Step S34)

The generated video signals ($R_2$, $G_2$, $B_2$) are outputted to the image-outputting part 110.

As explained above, in the imaging device 10 according to Embodiment 1, the image sensor 102 includes a plurality of pixels on which a plurality of filters R, G, B, C are arranged in a predetermined pattern. The plurality of filters includes three types of filters R, G, B which selectively transmit light of a visible light region different from each other, and have spectral transmittances equal to each other in a near-infrared light region, and a clear filter C (one type of filter) in which a spectral transmittance in the visible light region is expressed by a linear sum of the spectral transmittances of the three types of filters R, G, B, and which has a spectral transmittance equal to the spectral transmittances of the three types of filter R, G, B in a near-infrared light region. And from the plurality of pixels, a first output signal $S_1$ is outputted which varies non-linearly in accordance with luminance of each incident light, and in the output signal linear-transforming part 104, when assuming that the image sensor 102 outputs a second output signal $S_2$ which varies linearly throughout an input luminance range of the incident light, the first output signal $S_1$ is transformed into the second output signal $S_2$ which is predicted to be outputted from the image sensor 102. Based on the second output signal $S_2$, with respect to all the pixels, the color signal-generating part 105*a* generates a plurality of linear color signals ($R_0$, $G_0$, $B_0$) by interpolating a plurality of lacking color signals, and from the generated plurality of linear color signals ($R_0$, $G_0$, $B_0$) (or linear-corrected color signals ($R_1$, $G_1$, $B_1$)), the infrared-separating part 1053*a* separates a near-infrared light component and generates a plurality of infrared-separated color signals having linearity. Then, the luminance signal-generating part 107 generates a luminance signal $Y_1$ having non-linearity from the first output signal $S_1$, and the color-luminance-combining part 109 combines the plurality of infrared-separated color signals having linearity thus generated and the luminance signal $Y_1$ (or luminance-corrected signal $Y_2$) having non-linearity, and generates video signals ($R_2$, $G_2$, $B_2$). Therefore, even in a case of photographing a photographic subject in which a dynamic range is large, it is possible to generate a suitable color image in which there are no blown-out highlights or blocked-up shadows by the luminance signal $Y_1$ (or luminance-corrected signal $Y_2$) having non-linearity and color reproducibility is high by color signals having linearity in which a near-infrared light component is separated.

Additionally, in the imaging device 10 according to Embodiment 1, in the saturated region-determining part 1058a (color saturation-detecting part), when it is detected that a linearized output signal RAW1 is saturated, in the second color-separating part 1055 (saturation-suppressing part), clipping processing is performed in which values of infrared non-separated color signals corresponding to the linearized output signal RAW1 in which saturation has been detected are transformed into predetermined values. Then, the infrared non-separated color signals generated by the clipping processing and the luminance signal $Y_1$ (or luminance-corrected signal $Y_2$) are combined, and video signals ($R_2$, $G_2$, $B_2$) are generated. On the other hand, when it is not determined that the linearized output signal RAW1 is saturated, infrared-separated color signals which are outputted from the infrared-separating part 1053a and the luminance signal $Y_1$ (or luminance-corrected signal $Y_2$) are combined, and video signals ($R_2$, $G_2$, $B_2$) are generated. Therefore, when no color saturation occurs, it is possible to output color which is approximately equal to human color vision characteristics containing no infrared components, and even when color saturation occurs, an occurrence of false color by saturation is prevented, an occurrence of a color shift in achromatic color is prevented by the clipping processing, and it is possible to output color which is close to actual color without an uncomfortable feeling for the human color vision characteristics.

Additionally, in the imaging device 10 according to Embodiment 1, the color-luminance-combining part 109 normalizes linear color signals ($R_0$, $G_0$, $B_0$) generated in the first linear interpolation-processing part 1052 as infrared-separated color signals (or linear-corrected color signals ($R_1$, $G_1$, $B_1$)) by a luminance component Yc and generates normalized color signals (Rc, Gc, Bc), or normalizes linear color signals ($R_0$, $G_0$, $B_0$) generated in the second linear interpolation-processing part 1056 as infrared non-separated color signals (or linear-corrected color signals ($R_1$, $G_1$, $B_1$)) by a luminance component Yc and generates normalized color signals (Rc, Gc, Bc). Then, video signals ($R_2$, $G_2$, $B_2$) are generated by multiplying the normalized color signals (Rc, Gc, Bc) thus generated and the luminance signal $Y_1$ (or luminance-corrected signal $Y_2$). Thus, by combining the color signals and the luminance signal by simple arithmetic processing, it is possible to generate video signals ($R_2$, $G_2$, $B_2$) in which there are no blown-out highlights or blocked-up shadows and color reproducibility is high by the color signals having linearity.

Note that in the present embodiment, an explanation has been made in which the image sensor 102 has a color filter of primary colors; however, this can be achieved even by use of a color filter of complementary colors. Additionally, based on the human color vision characteristics, a plurality of color filters can also be used in which a relationship between luminance and color is expressed by at least one expression.

Additionally, in the present embodiment, in the infrared-separated color signal-correcting part 1054 and the infrared including color signal-correcting part 1057, color correction processing is performed, and in the luminance signal-correcting part 108, luminance correction processing is performed; however, those color correction and luminance correction can be properly performed as necessary.

Furthermore, in the present embodiment, an example is shown in which the output signal RAW0 as one image data is separated into a color signal and a luminance signal and they are combined; however, the color signal and the luminance signal do not need to be generated from the one image data. For example, on an image sensor side, imaging is performed in which input-output characteristics are sequentially switched for the color signal and the luminance signal, and combining can be performed by use of two different imaged images, or by use of two image sensors in which imaging ranges are approximately the same, two images having different input-output characteristics for the color signal and the luminance signal are imaged, and combining can be performed.

Embodiment 2

Next, Embodiment 2 as another embodiment of an imaging device according to the present invention will be explained with reference to FIG. 12.

Figure 12:
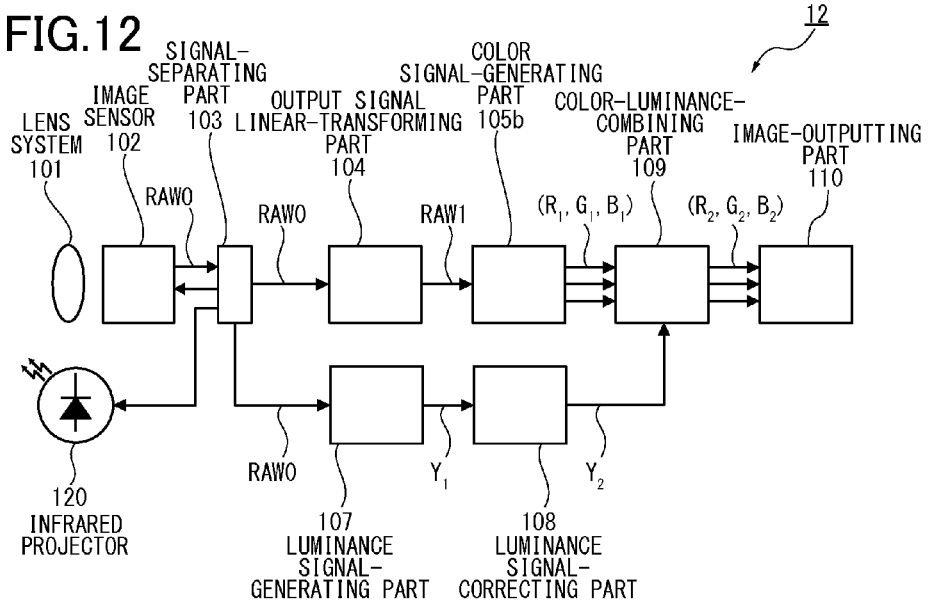
FIG. 12 is a block diagram showing a detailed structure of an imaging device in Embodiment 2 as one embodiment of the present invention.

FIG. 12 shows a structure of an imaging device 12 according to Embodiment 2. The imaging device 12 is an imaging device in which the imaging device 10 explained in Embodiment 1 further includes an infrared projector 120, and which is applied to use of monitoring a rear side, lateral sides, rear-lateral sides of a vehicle by illuminating an imaging field of the imaging device 102 by near-infrared light.

In the imaging device 12, by emitting near-infrared illumination light from the infrared projector 120, monitoring performance in the darkness is further improved. However, since near-infrared light components increase extremely in an image signal which is observed, in the signal processing explained in Embodiment 1, separation of near-infrared light is not sufficiently performed, and the near-infrared light components remain. Additionally, due to remaining of the near-infrared light components, more noise occurs than usually, and there is a possibility that color is not appropriately reproduced.

An object of Embodiment 2 is to solve such a problem. The imaging device 12 is different in structure from the imaging device 10 explained in Embodiment 1 in that the imaging device 12 further includes the infrared projector 120 which emits the near-infrared illumination light, and includes a color signal-generating part 105b in place of the color signal-generating part 105a and a saturated region-determining part 1058b (see FIG. 13) in place of the saturated region-determining part 1058a.

Figure 13:
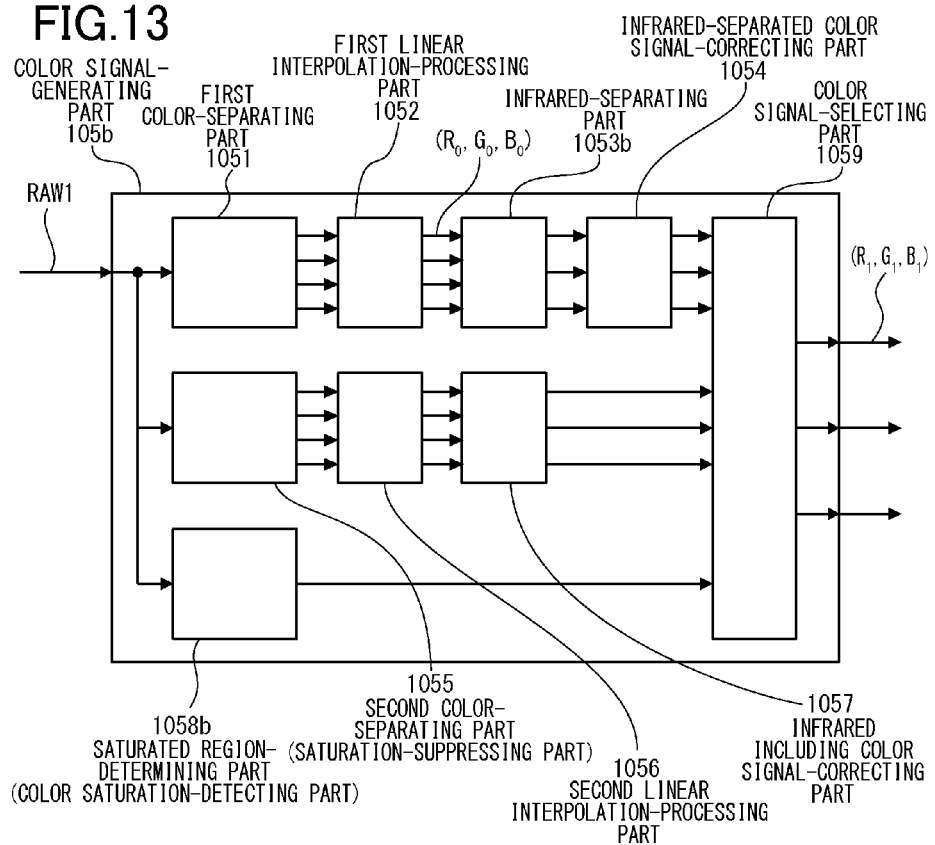
FIG. 13 is a diagram showing a detailed structure of a color signal-generating part in Embodiment 2 as one embodiment of the present invention.

The detailed structure of the color signal-generating part 105b is shown in FIG. 13. The color signal-generating part 105b is different in structure from the color signal-generating part 105a explained in Embodiment 1 in that the color signal-generating part 105b includes an infrared-separating part 1053b in place of the infrared-separating part 1053a and the saturated region-determining part 1058b in place of the saturated region-determining part 1058a.

Hereinafter, regarding the operation of the imaging device 12, the difference from the imaging device 10 explained in Embodiment 1 will be explained.

(Expression 17) is a variation of (Expression 1), and it can be seen that in a visible light region, visible light components are offset.

$$\alpha X_T + \beta Y_T + \gamma Z_T - T_T = 0 \quad \text{(Expression 17)}$$

Figure 11:
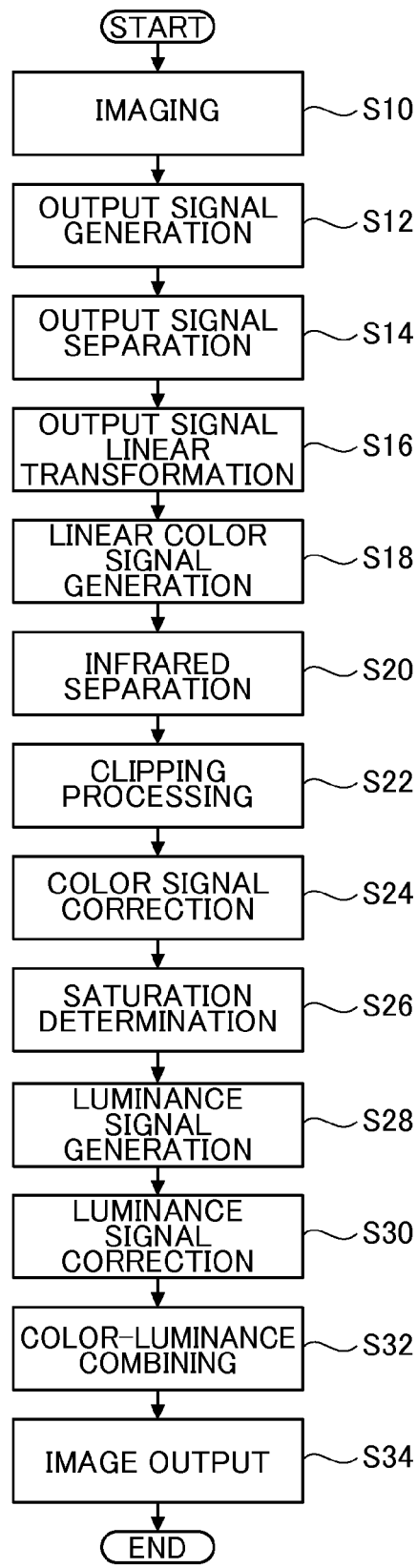
FIG. 11 is a flow diagram showing a processing flow in Embodiment 1 as one embodiment of the present invention.

However, at this time, near-infrared light components only for $(\alpha+\beta\gamma-1)i$ are not separated and remain, and therefore, in place of Step S20 described in the flow diagram in FIG. 11, the above-described (Expression 2) and (Expression 3) are transformed into (Expression 18) and (Expression 19), respectively, and it is possible to calculate the near-infrared light components which are not separated and remain.

$$\begin{bmatrix} X \\ Y \\ Z \\ i \end{bmatrix} = M_2 \begin{bmatrix} X+i \\ Y+i \\ Z+i \\ T+i \end{bmatrix} \quad \text{(Expression 18)}$$

$$M_2 = \frac{1}{\alpha+\beta+\gamma-1} \begin{bmatrix} \beta+\gamma-1 & -\beta & -\gamma & 1 \\ -\alpha & \alpha+\gamma-1 & -\gamma & 1 \\ -\alpha & -\beta & \alpha+\beta-1 & 1 \\ \alpha & \beta & \gamma & -1 \end{bmatrix} \quad \text{(Expression 19)}$$

Additionally, in Step S26 in the flow diagram in FIG. 11, when performing determination of saturated pixels by the saturated region-determining part 1058b and determination whether infrared removal is performed or not, a determination item based on an amount of the near-infrared light components separated in the infrared-separating part 1053b is added in this determination processing.

That is, the saturated region-determining part 1058b determines a pixel as a saturated pixel when the pixel is equal to or greater than a saturation signal level and determined to be saturated, or when the pixel in which in the infrared-separating part 1053b, a near-infrared light component amount calculated by (Expression 18) and (Expression 19) exceeds a predetermined reference value of infrared light component amount. And then, likewise to Embodiment 1, a binary image is generated in which a saturated pixel is taken as 1 and pixels other than the saturated pixel are taken as 0, and dilation (expansion) processing is performed with respect to the binary image in accordance with a kernel size in linear interpolation.

Thus, it is possible to prevent an occurrence of a color shift even in a region illuminated by the infrared projector 120. However, an object in which color reproducibility is emphasized as a signal device using a halogen lamp is also determined as a saturated pixel, and therefore, a signal amount of near-infrared component or a reference value of infrared light component amount used for the determination can be corrected (normalized) by a visible light component amount.

As explained above, in the imaging device according to Embodiment 2, when the linearized output signal RAW1 is equal to or greater than the saturation signal level, or a near-infrared light component amount remaining after generating the infrared-separated color signals in the infrared-separating part 1053b exceeds the reference value of infrared light component amount, the saturated region-determining part 1058b (color saturation-detecting part) determines that a saturated pixel is generated, and in the second color-separating part 1055 (saturation-suppressing part), clipping processing is performed in which values of the infrared non-separated color signals in which saturation has been detected are transformed into predetermined values. And in the color-luminance-combining part 109, the infrared non-separated color signals in which the clipping processing has been performed and the luminance signal $Y_1$ (or luminance-corrected signal $Y_2$) are combined and video signals ($R_2$, $G_2$, $B_2$) are generated. Therefore, even when the infrared projector 120 emits near-infrared light toward an imaging range of the image sensor 102, an occurrence of false color in reflected light of the emitted near-infrared light is prevented, and an occurrence of a color shift in achromatic color is prevented by the clipping processing, and it is possible to output color close to actual color without an influence of the near-infrared light.

Note that in Embodiment 2, the structure including the infrared projector 120 has been explained; however, a similar saturation determination can be performed when there is not the infrared projector 120.

Although the present invention has been described in terms of exemplary embodiments with reference to the drawings, it is not limited thereto. It should be appreciated that variations may be made in the embodiments described by persons skilled in the art without departing from the scope of the present invention defined by the following claims.

CROSS-REFERENCE TO RELATED APPLICATIONS

The present application is based on and claims priority from Japanese Patent Application Number 2013-32202, filed Feb. 21, 2013, the disclosure of which is hereby incorporated reference herein in its entirety.

The invention claimed is:
1. An imaging device comprising:
an image sensor that includes a plurality of pixels on which a plurality of filters are respectively arranged in a predetermined manner, the image sensor outputting from each of the pixels a first output signal that is output in response to input luminance of incident light incident to the respective pixel and varies non-linearly in accordance with the luminance of the incident light incident to the respective pixel,
the plurality of filters that includes:
three types of filters that selectively transmit light of a visible light region different from each other and have spectral transmittances equal to each other in a near-infrared light region, and
one type of filter in which a spectral transmittance of a visible light region is expressed by a linear sum of the spectral transmittances of the three types of filters, the one type of filter having a spectral transmittance equal to one of the spectral transmittances of the three types of filters in the near-infrared light region;
an output signal linear-transforming part that transforms the non-linear first output signal outputted from each of the plurality of pixels to a linear second output signal for the respective one of the plurality of pixels, the second output signal corresponding to the first output signal predicted when assuming that the first output signal output by the image sensor varies linearly in accordance with the luminance of the incident light throughout a luminance range of the incident light;

a color signal-generating part that, from the second output signals, generates a plurality of color signals each corresponding to each type of the four types of filters and predicted to be outputted from each of the plurality of pixels when assuming that types of filters other than the type of filter actually arranged on the corresponding pixel among the four types of filters are arranged on each of the plurality of pixels;

an infrared-separating part that generates a plurality of infrared-separated color signals in which a near-infrared light component is separated and removed from the plurality of color signals;

a luminance signal-generating part that generates a luminance signal from the first output signal; and a color-luminance-combining part that combines the plurality of the infrared-separated color signals and the luminance signal and generates video signals so that a color image is generated, in which even under a situation where contrast between light and shade is extremely large, an occurrence of blocked-up shadows and blown-out highlights is suppressed, and which has color reproducibility consistent with human color vision characteristics.

2. The imaging device according to claim 1, comprising:
a color saturation-detecting part that detects the color signals are saturated; and
a saturation-suppressing part that performs clipping processing in which values of the color signals detected to be saturated are transformed into predetermined values and outputs infrared non-separated color signals,
wherein when the color saturation-detecting part detects that the color signals are saturated, the color-luminance-combining part combines the infrared non-separated color signals and the luminance signal and generates the video signals, and
when the color saturation-detecting part does not detect that the color signals are saturated, the color-luminance-combining part combines infrared-separated color signals outputted from the infrared-separating part and the luminance signal and generates the video signals.

3. The imaging device according to claim 2, wherein the infrared-separating part further calculates a near-infrared light component amount remaining after generating the infrared-separated color signals,
the saturation-suppressing part determines an output of the color saturation-detecting part or an occurrence of saturated pixel based on the near-infrared light component amount, and when a saturated pixel is detected, performs clipping processing in which a pixel value of the saturated pixel is transformed into a predetermined value, and outputs infrared non-separated color signals, and
the color-luminance-combining part combines the infrared non-separated color signals and the luminance signal and generates the video signals.

4. The imaging device according to claim 2, wherein the color-luminance-combining part combines normalized signals in which the infrared-separated color signals are normalized by a luminance component calculated from the infrared-separated color signals, or normalized signals in which the infrared non-separated color signals are normalized by a luminance component calculated from the infrared non-separated color signals and the luminance signal by multiplying, and generates the video signals.

5. The imaging device according to claim 3, wherein the color-luminance-combining part combines normalized signals in which the infrared-separated color signals are normalized by a luminance component calculated from the infrared-separated color signals, or normalized signals in which the infrared non-separated color signals are normalized by a luminance component calculated from the infrared non-separated color signals and the luminance signal by multiplying, and generates the video signals.

6. The imaging device according to claim 1, wherein the one type of filter is a clear filter.

7. The imaging device according to claim 1, further comprising a luminance signal-correcting part,
wherein the luminance signal-correcting part performs contrast adjustment to the luminance signal and generates a luminance-corrected signal, and
wherein the color-luminance-combining part combines the luminance-corrected signal and the plurality of the infrared-separated color signals, and generates video signals.

* * * * *